Sept. 21, 1965   E. W. KELLEY ETAL   3,207,444
WATER SPRAY ATTACHMENT HAVING AIR CONTROL AND LIQUID
ADDITIVE PASSAGES CONNECTED TO A MIXING CHAMBER
Filed Aug. 2, 1963

INVENTORS
Edward W. Kelley &
BY Kenneth W. Sward

Dale A. Winnie
ATTORNEY

United States Patent Office 3,207,444
Patented Sept. 21, 1965

3,207,444
WATER SPRAY ATTACHMENT HAVING AIR CONTROL AND LIQUID ADDITIVE PASSAGES CONNECTED TO A MIXING CHAMBER
Edward W. Kelley and Kenneth W. Sward, Springfield, Ill., assignors to Dura Corporation, Oak Park, Mich., a corporation of Michigan
Filed Aug. 2, 1963, Ser. No. 299,556
4 Claims. (Cl. 239—318)

This invention relates to means for aerating and adding a controlled amount of a concentrate to a stream of water, and more particularly to a water spray attachment incorporating such features and for use with a garden hose.

There are numerous different instances where it is desirable to add a highly concentrated solution of some additive to a stream of water and to be able to apply the diluted end product directly to a work surface. One such example is in the washing of cars and other vehicles where it is desirable to add a detergent solution to a stream of water as it is applied directly to the vehicle body surfaces to be cleaned. Another instance is in dish washing and like devices. Still other instances are the garden hose attachments for spraying insecticides, fungicides and fertilizers on lawns and shrubs or in flower and vegetable gardens.

Most of the devices and means presently known for adding a concentrate to a flowing stream of water, and for aerating the water, make use of machine tooled devices including intricate passageways, valve fittings, control mechanisms and the like with separate bottle holders for the concentrate. These devices are expensive to manufacture, present problems of assembly and are subject to clogging and failures in service and difficulties in attempting cleaning and repairs. Those devices which are attached to garden hoses and the like must be removed after they have served their purpose and seldom are they susceptible to multiple use without additional control means, shut-off valves and the like.

It is an object of this invention to provide a device for adding a controlled amount of a concentrate solution to a stream of water, and for separately or conjunctively aerating the water receptive thereof, and which may be made of plastic material and without any operative parts.

It is an object of this invention to provide a device which may be made as an attachment for a garden hose or the like and includes an applicator with a handle in which certain chambers and passageways are formed and provided for aeration and concentrate flow control induced solely by the flow of air and water therethrough.

It is an object of this invention to provide means of simple manual control and selection of the purpose and function of the hose attachment last mentioned for either or both the aeration or application of a concentrate to the water supply therethrough.

This invention also contemplates the combination of such aeration and concentrate control means with an applicator for dispersing the end product in a flat, jet stream covering a large area.

More specifically, and as devised for car washing purposes, it is an object of this invention to provide a device of simple and relatively inexpensive construction, preferably made of plastic, which includes no operable parts subject to wear or failure, and has interconnected and communicating chambers and passageways in which a detergent concentrate may be provided and through which aeration of the water stream and controlled draw of the concentrate into the water stream is attained by manual control of the aerating flow in the device. Furthermore, a simple applicator is employed with special features to obtain a directional and encompassing flow of fluid for surface cleaning and flushing purposes.

These and other objects and advantages to be gained in the practice of this invention will be better understood and appreciated upon a reading of the following specification in regard to a preferred embodiment of the invention and having reference to the accompanying drawings wherein.

Figure 1:
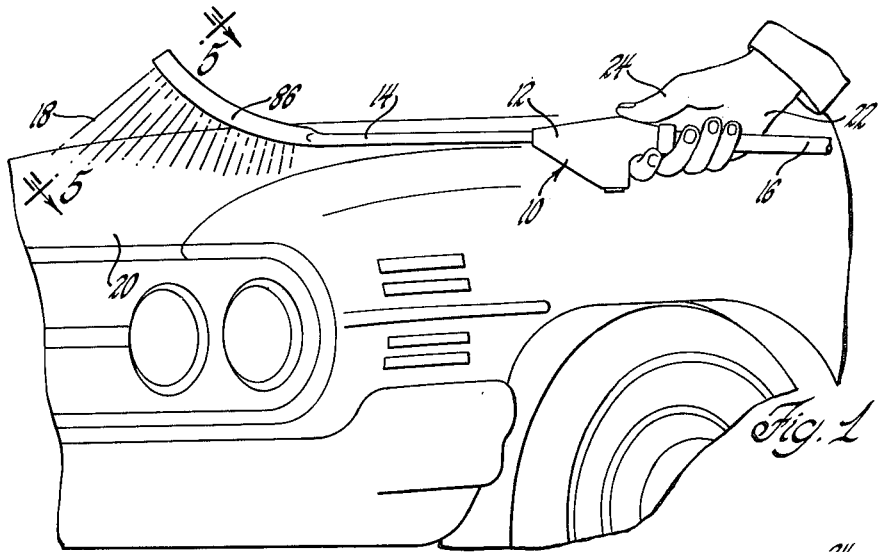
FIGURE 1 is a fragmentary section of an automobile showing a side view of the present invention, in the form of a car washing device, as used therewith.

The car washing device 10 shown by the drawings includes a handle or chamber member 12 and a water spray applicator or extension 14. The handle member 12 is a fitting which is engaged to a garden hose 16 and the applicator 14 is adapted to emit a flat and forceful spray 18 over the surface of such as the car body 20 to loosen and carry away dirt and road grime collected thereon.

The handle part 12 of the car washing device 10 is designed so that a person's hand 22 fits partly on the hose 16 and partly on the handle much in the manner that the usual garden hose nozzle is held. More significantly, and as will be later appreciated more fully, the thumb 24 of a person's hand may be disposed easily over the top of the handle 12 for certain useful work.

Figure 2:
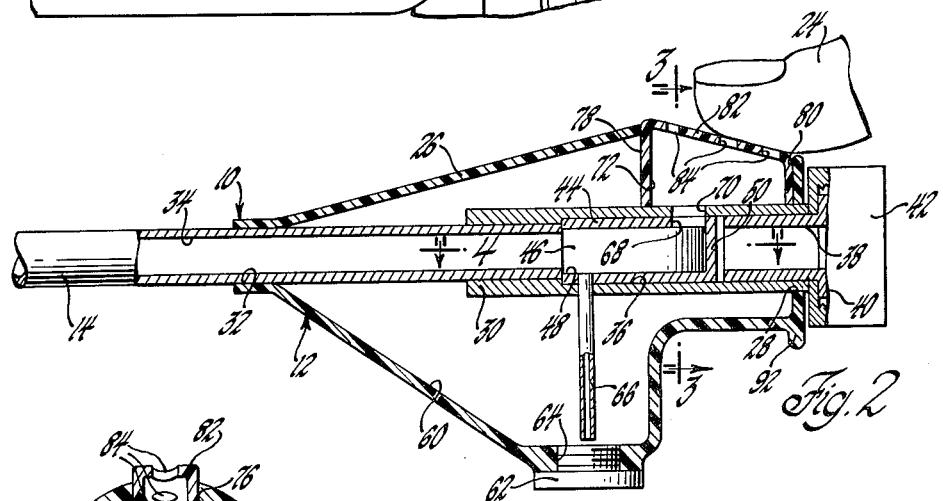
FIGURE 2 is an enlarged cross-sectional side view of the car washing device shown by FIGURE 1.
Figure 3:
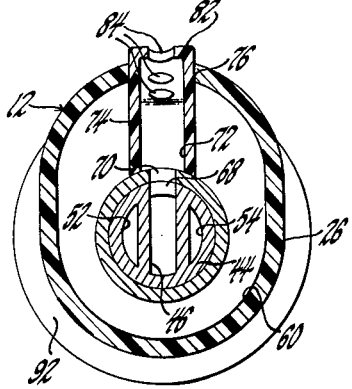
FIGURE 3 is a further enlarged cross-sectional end view of the car washing device shown by FIGURE 2 as seen in the plane of line 3—3 and looking in the direction of the arrows thereon.
Figure 4:
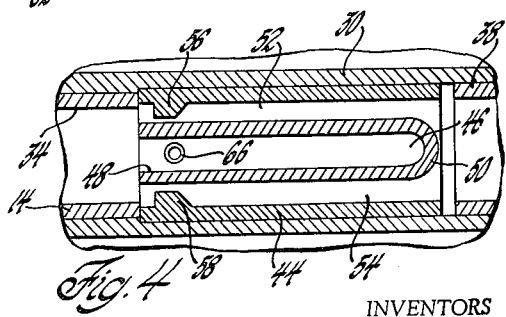
FIGURE 4 is a further enlarged cross-sectional plan view of the car washing device shown by FIGURE 2 as seen in the plane of line 4—4 and looking in the direction of the arrows thereon.

FIGURE 2 shows the handle member 12 as including an outer disposed chamber defining wall 26 having an opening 28 in one end through which is extended a passage forming member 30. An opening 32 is provided through the other end of the handle member and receives the end of the applicator 14 therein. The applicator is a tubular member, with a flow passage 34 therethrough, and is received in engagement with the passage member 30 to provide a through flow passage 36 straight through the handle.

A short tubular member 38 with an annular flange 40 is received in the end of the passage member 30 to retain a threaded hose coupling fitting 42 thereto.

Within the through flow passage 36 is provided a cylindrical member 44. It is formed to include a mixing chamber 46 centrally therewithin and extending diametrically across the flow passage. The mixing chamber is closed at the upstream end 50 thereof but is open at the downstream end 48. Suitable passages 52 and 54 extend the length of the member 44 and on opposite sides of the mixing chamber 46 to permit the flow of water therearound.

Within the flow passages 52 and 54, near the downstream end of the cylindrical member 46 are provided inwardly disposed walls 56 and 58 which serve to form a venturi throat for the water flowing therethrough.

The bottom portion of the handle 12 is formed to include a chamber area 60 within which a concentrate of some detergent solution is received. A threaded plug 62 is received in a receptive opening 64 in the bottom wall to enable the chamber to be filled. A siphon tube 66 extending into the chamber and through the passage member 30 and downstream the end of the cylindrical member 44 to provide an access for the flow of the detergent solution to the mixing chamber 46 in a manner yet to be described.

An opening 68 through the top wall of the cylindrical member 44, from the mixing chamber 46, is aligned with an opening 70 in the passage member 30 for access to a chamber area 72 provided in the upper and rearwardly disposed end of the handle 12. The chamber area 72 is formed by side wall members 74 and 76 and end wall members 78 and 80 provided within the outer defining wall 26 of the handle 12 and separating the chamber area 72 from the detergent retaining chamber space 60.

A rearwardly inclined outer disposed upper wall 82 closes the chamber area 72 and is provided with a plurality of air inlet openings or holes 84. Such openings or holes 84 are aligned and in the present instance include only three in number. They are conveniently disposed so that a person's thumb 24 can be used to close one or more of the openings, as is shown.

Figure 5:
FIGURE 5 is an enlarged cross-sectional end view of the applicator end of the car washing device shown by FIGURE 1, as seen in the plane 5—5 and looking in the direction of the arrows thereon.

Referring now to the applicator or extension 14, it will be noted to include a curved end 86 which is flattened or, more properly, formed to a rectangular section as shown by FIGURE 5. In addition, a plurality of separate outlet openings 88 are formed through the outer disposed peripheral wall 90 of the curved end and near one of the side walls thereof. The openings are so oriented that a divergent, flat and forceful spray 18 is obtained which will cover a large area and is most effective in tempering the surface to be cleansed or for flushing and rinsing as desired.

A finger grip flange 92 about the end of the handle 12 is optional and simply provides a better means of holding the handle 12 in a manner for more easily disposing the thumb 24 in a spray controlling operative position.

The car washing device 10 is used in the following manner:

The chamber area 60 is filled with a concentrate of some detergent solution by turning the handle 12 over, removing the plug 62 and filling the chamber to a certain level. This will be less than full if the chamber area 60 extends into the forward and upper part of the handle 12 since any excess would merely flow out the siphon tube 66 when the handle is turned back over. If desired, light colored plastic materials may be used with a high level mark provided on the outside of the handle so that the shadow of the fluid level will be visible through the outer chamber wall 26. In any event, the waste is slight and insignificant.

After the detergent receptive chamber 60 is filled, the coupling 42 is used to connect the handle 12 to the garden hose 16.

Water flowing through the handle 12 will pass through the flow passage 36, around the mixing chamber 46, across the venturi throats formed by the inwardly disposed walls 56 and 58 and into the flow passage 34 of the tubular end of the applicator 14. In so doing, the velocity of the water past the downstream end of the mixing chamber 46 will induce the flow of air and detergent into the mixing chamber and on into the water stream in the manner next described.

Assuming first that all of the air inlet openings 84 to the chamber area 72 are uncovered, the water flow past the end of the mixing chamber 46 will create a suction pressure which will draw air through all of the openings 84 and cause maximum aeration of the water. This air flow is designed to be such that no suction is created over the exposed end of the siphon tube 66 in the downstream end of the mixing chamber 46 and no detergent flow results.

Assuming next that one of the air inlet openings 84 are closed, a sufficient suction by reduced air pressure is created over the siphon tube 66 to draw a certain amount of detergent solution into the air stream where it is mixed and carried on into the water jet stream.

When two of the air inlet openings 84 are closed the suction pressure is greater on the siphon tube 66 and there is more detergent flow with less air flow to the water jet stream.

Obviously, when all of the air inlet openings 84 are covered, and therefore closed, there is no aeration of the water and maximum detergent flows through the applicator.

The car washing device 10 is preferably made entirely of plastic and includes no moving parts. Accordingly, it is a relatively inexpensive attachment for use with the ordinary garden hose and can be readily used to apply water for soaking and tempering a car body surface, applying a selected amount of detergent, and for rinsing and flushing dirt and detergent away.

The device is light in weight, easy to hold and manipulate. The operator has full control simply by adjusting the position of his thumb to cover none, one or more, or all of the air inlet or vent ports 84 to obtain a highly aerated stream of water or a detergent flow of desired concentration.

The aerated flow is particularly good for tempering rinsing a surface to be cleaned. Air is taken from the atmosphere without mechanical assistance and mixes thoroughly with the water to produce a flat jet spray with high velocity which contributes greatly in loosening and flushing away dirt and foreign matter. The self-contained process of aeration enables an air bubble spray to be obtained in which the explosive force of the release air bubbles striking the car surface has great benefit in cleansing and flushing away dirt and foreign particles.

When one or more of the vent hole openings 84 is closed, the air flow is decreased and the vacuum or suction or the venturi about the mixing chamber 46 causes detergent flow into the water stream. The result is almost instantaneous and is foolproof. Absolute control is obtained and variation in the richness of the mixture is readily available by simply closing or opening other of the vent holes.

The applicator 14 is of sufficient length to reach the center of the average size car and the curve of the end is intended to produce the flat and divergent spray mentioned. This, in turn, results in a sheet of water sufficient to cover approximately half the top of a car with a single stroke, assuming ample water pressure; the flat spray functions somewhat as a wedge and is quite forceful and effective when held at about thirty or forty-five degrees to the car surface. By simple manipulation of one's thumb a detergent flow followed by an aerated or clear flow of water can be achieved to alternately wash and flush away the surface dirt.

It will be appreciated that the device shown and described may have other uses than the one specifically mentioned. As previously implied, this device and the aerating and detergent inducing flow methods used may be incorporated into applicators for garden, lawn, shrub and flower sprays, or the like, if not presently properly designed therefore, and for numerous other uses.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

We claim:

1. A water spray attachment for garden hoses and the like, and comprising;

a member having a fluid flow passage provided therethrough, means forming a venturi passage in said flow passage, and means forming a mixed chamber provided in said passages and closed thereto except at the downstream end of said chamber, means forming an air inductive chamber space separate and apart from said flow passage and connected thereto through said mixing chamber, means forming another chamber space separate and apart from said flow passage for a fluid additive and having a suction tube connected to said mixing chamber, and said means forming a mixing chamber in said flow passage restricting the flow of fluid therethrough and increasing the flow velocity thereof past the open end of said chamber for creating a low pressure condition in said mixing chamber and inducing the flow of air and fluid additive therethrough, and means for varying the air induced through said air inductive chamber space for changing the pressure condition in said mixing chamber and varying the air and fluid additive flow through said mixing chamber to said fluid flow passage.

2. The water spray attachment of claim 1, said means forming the mixing chamber having the open downstream end thereof extended through said means forming the venturi passage and forming in part the restriction inherent thereto.

3. The water spray attachment of claim 1, said suction tube being connected to said means forming the mixing chamber between the open end thereof and the connection of said means forming the air inductive chamber space thereto.

4. The water spray attachment of claim 3, said mixing chamber and venturi passage being formed and provided together as a single integral part receptive within said fluid flow passage as an intermediate part thereof.

References Cited by the Examiner

UNITED STATES PATENTS

| | | | |
|---|---|---|---|
| 273,940 | 3/83 | Bonninghausen | 239—559 |
| 2,198,998 | 4/40 | Honsberger | 239—318 |
| 2,316,781 | 4/43 | Fox | 239—310 |
| 2,325,242 | 7/43 | Gordon | 239—310 |
| 2,576,668 | 11/51 | Bramhall | 239—347 |
| 2,609,236 | 9/52 | Myshock | 239—559 |
| 2,724,583 | 11/55 | Targosh et al. | 239—348 |
| 2,800,313 | 7/57 | Targosh et al. | 239—347 |
| 2,827,329 | 3/58 | Bullock | 239—347 |
| 3,039,492 | 6/62 | Brucker | 239—315 |
| 3,042,314 | 7/62 | Packard et al. | 239—310 |
| 3,075,557 | 1/63 | Kuriluk | 239—317 |
| 3,106,345 | 10/63 | Wukowitz | 239—310 |
| 3,112,884 | 12/63 | Gilmour | 239—348 |

FOREIGN PATENTS 415,248   8/34   Great Britain.

M. HENSON WOOD, JR., *Primary Examiner.*

EVERETT W. KIRBY, *Examiner.*